Feb. 18, 1941.  H. E. PULLEYBLANK  2,232,473
SELF-ADJUSTING ANTIFRICTION BEARING
Filed May 10, 1939
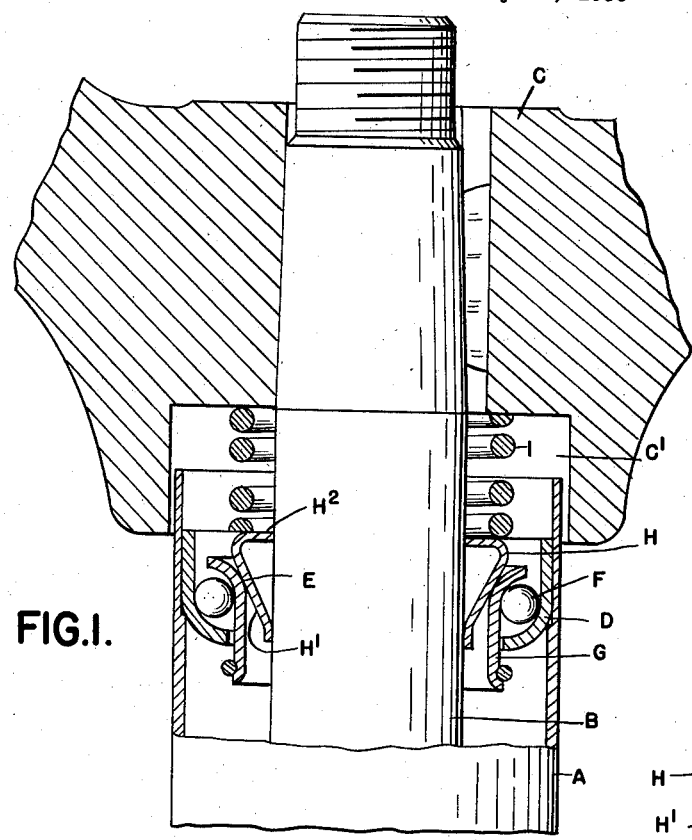
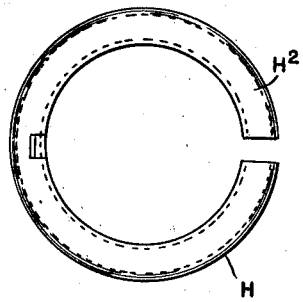
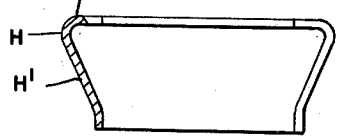
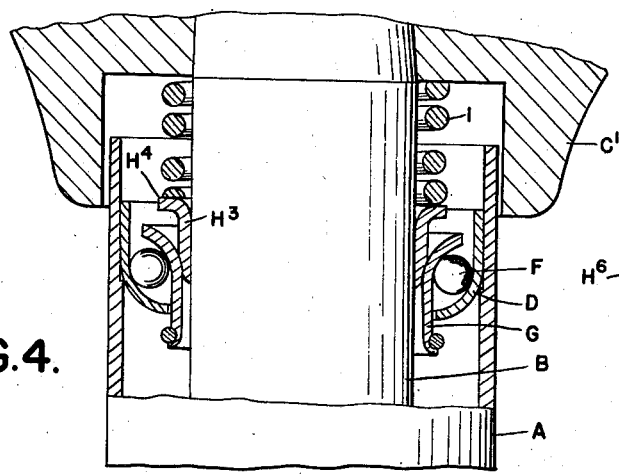
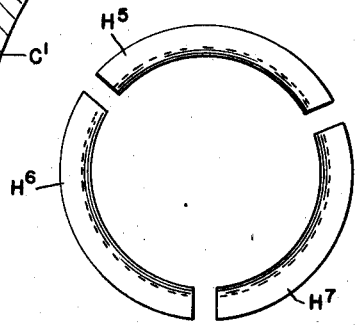
INVENTOR.
HARPER E. PULLEYBLANK
BY
ATTORNEYS Patented Feb. 18, 1941

2,232,473

UNITED STATES PATENT OFFICE 2,232,473

SELF-ADJUSTING ANTIFRICTION BEARING

Harper E. Pulleyblank, Detroit, Mich., assignor to Gemmer Manufacturing Company, Detroit, Mich., a corporation of Michigan Application May 10, 1939, Serial No. 272,881

2 Claims. (Cl. 308—197)

The invention relates to self-adjusting antifriction bearings and more particularly to constructions designed for use in connection with motor vehicle steering gears for supporting the rotary steering stem. With such structures the stems are usually formed of commercial tubing varying somewhat in external diameter. Consequently, a bearing member which is sufficient in internal diameter to engage the maximum diameter of stems, will only loosely fit stems slightly smaller in diameter. It is, therefore, one of the objects of my invention to provide a construction of bearing which is applicable to all sizes of stems within tolerance limits, said bearing being provided with means for automatically taking up all lost motion between the same and the stem and being substantially non-yielding in a radial direction. It is a further object to obtain a construction which will automatically adjust to compensate for wear so as to avoid lost motion at any time. Still further it is an object to obtain a construction in which one standard size of bearing may be used with steering stems of various sizes. With these objects in view the invention consists in the construction as hereinafter set forth.

In the drawing:

Figure 1 is a sectional elevation showing my improved bearing as applied to the steering stem and post of a motor vehicle;

Figure 2 is a plan view of the self-adjusting bushing for engaging the stem;

Figure 3 is a cross section thereof;

Figure 4 is a view similar to Figure 1, showing a modified construction;

Figure 5 is a view similar to Figure 2, showing a modified construction of bushing or adapter.

As illustrated, A is the tubular post of a steering mechanism, and B is the rotary steering stem having attached to its upper end the hub C of the steering wheel. D is the outer race member of a ball bearing which is placed within the upper end of the tubular post A, the latter being internally machined to form a seat E exactly fitting the external diameter of said race member. F are the balls and G is the inner race member of the bearing. This inner race member is of an internal diameter which is in excess of the maximum external diameter of the stem B, so as to be engageable with all variations thereof. H is a bushing member preferably formed of pressed sheet metal and split at one side so as to permit of expansion and contraction. This bushing has a tapering portion H' which when inserted within the inner race member G and pressed downward will conform the inner surface of the bushing to the stem B. It will also exert an end thrust upon ther ace member B forcing the latter against the balls F and taking up all lost motion. A coil spring I located within a recess C' in the hub C has its upper end abutting against said hub and its lower end against the bushing H. This spring is properly tensioned to exert the desired amount of pressure on the bushing sufficient to conform the same to the stem and to also hold the race members in engagement with the balls, but without objectionable pressure on the latter. Due to the fact that the thrust on the bearing is at a relatively large angle to the axis of rotation, the engaging faces of the bushing and the race member may be substantially perpendicular to the line of thrust. Thus, any reaction tending to force the bushing out of engagement with the race member will be comparatively slight and will be resisted by the spring I.

As shown in Figure 1, the steering stem is considerably smaller in diameter than the internal diameter of the bearing, so that the radial dimension of the bushing must be great enough to take up the intervening space. For this reason the bushing H is hollow and preferably formed of pressed sheet metal, being provided at its large end with an inturned flange H² which forms a bearing on the stem as well as the bearing at the small end. In Figure 4 the post and bearing are of the same dimensions as in Figure 1, but the steering stem is larger in diameter so as to have only a slight clearance between the same and the inner race member of the bearing. The bushing H³ is, therefore, constructed with a split cylindrical portion which directly contacts with the stem and which is tapered at its lower end for engagement with the race member, while at its upper end it is provided with an outwardly extending flange H⁴. Thus, by making the bearing of an internal diameter sufficient to receive steering stems of maximum diameter this may be used for all sizes of stems, it being only necessary to select a bushing or adapter corresponding to the particular size of stem which is used.

Where a steering mechanism is used for extra heavy duty the radial pressure exerted on the wheel may be sufficient to distort a bushing or adapter which is formed of sufficiently thin metal to be flexible. However, with the split bushing the thickness of the metal cannot be greatly increased without rendering it too rigid for adjustment. I, therefore, use for heavy duty steering mechanisms an adapter formed of a plurality of separate segments, such as shown in Figure 5, in which three segments H⁵, H⁶ and H⁷ are used. These can be made either of solid metal or of sheet metal sufficiently heavy to withstand the radial stresses to which the bearing is subjected.

The bearing as above described, will prevent any radial movement of the stem relative to the post A, not only when first inserted, but also after the parts have been somewhat worn. It is easily manufactured at low cost and is easilfy applied.

What I claim as my invention is:

1. In an antifriction bearing for use on steering stems varying in external diameter within predetermined tolerance limits, the combination of a cupped sheet metal inner race member having an internal diameter in excess of the maximum external diameter of the stem, a sheet metal stamping forming a split bushing yieldable to conform to the stem having a tapered portion insertable between the stem and cupped race member with a bearing on the latter substantially perpendicular to the line of thrust, and means for exerting a resilient axial pressure on said bushing to maintain engagement of the same with said race member.

2. In an antifriction bearing for use on steering stems varying in external diameter within predetermined tolerance limits, the combination of a sheet metal stamping inner race member having an internal diameter in excess of the maximum external diameter of the stem and a hollow pressed sheet metal split bushing yieldable to conform to the stem, said bushing having a tapering portion insertable between the stem and the race member and an inturned flange at its large end and a coil spring sleeved on said stem exerting a resilient pressure against the large end of said bushing to maintain the engagement of the same with said race member.

HARPER E. PULLEYBLANK.